United States Patent
Sih et al.

(10) Patent No.: US 7,873,815 B2
(45) Date of Patent: Jan. 18, 2011

(54) DIGITAL SIGNAL PROCESSORS WITH CONFIGURABLE DUAL-MAC AND DUAL-ALU

(75) Inventors: Gilbert C. Sih, San Diego, CA (US); De D. Hsu, San Diego, CA (US); Way-Shing Lee, San Diego, CA (US); Xufeng Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 10/794,300

(22) Filed: Mar. 4, 2004

(65) Prior Publication Data

US 2005/0198472 A1  Sep. 8, 2005

(51) Int. Cl.
G06F 7/38 (2006.01)
(52) U.S. Cl. ...................... 712/221; 708/523
(58) Field of Classification Search ................ 708/523; 712/221
See application file for complete search history.

(56) References Cited

U.S. PATENT DOCUMENTS

| | | | | |
|---|---|---|---|---|
| 4,594,655 A | * | 6/1986 | Hao et al. | 712/218 |
| 5,204,828 A | * | 4/1993 | Kohn | 708/501 |
| 5,299,319 A | * | 3/1994 | Vassiliadis et al. | 712/221 |
| 5,623,434 A | * | 4/1997 | Purcell | 708/625 |
| 5,991,785 A | * | 11/1999 | Alidina et al. | 708/207 |
| 6,009,128 A | * | 12/1999 | Mobin et al. | 375/341 |
| 6,079,008 A | * | 6/2000 | Clery, III | 712/11 |
| 6,108,765 A | * | 8/2000 | Caudel et al. | 712/32 |
| 6,298,366 B1 | * | 10/2001 | Gatherer et al. | 708/523 |
| 6,418,527 B1 | * | 7/2002 | Rozenshein et al. | 712/208 |
| 6,446,193 B1 | | 9/2002 | Alidina et al. | |
| 6,523,055 B1 | * | 2/2003 | Yu et al. | 708/603 |
| 6,530,014 B2 | * | 3/2003 | Alidina et al. | 712/221 |
| 6,557,022 B1 | | 4/2003 | Sih et al. | |
| 6,606,700 B1 | * | 8/2003 | Sih et al. | 712/35 |
| 6,615,341 B2 | * | 9/2003 | Sih et al. | 712/221 |
| 6,625,630 B1 | * | 9/2003 | Vinitzky | 708/404 |
| 6,954,847 B2 | * | 10/2005 | Coon et al. | 712/208 |

FOREIGN PATENT DOCUMENTS

WO  0163379  8/2001

OTHER PUBLICATIONS

Hennessy, John L., Patterson, David A. "Computer Organization and Design: The hardware/software interface" Morgan Kaufmann Publishers, Inc. Second Edition, 1998. pp. 377-399.*
Supplementary European Search Report-EP05724448, Search Authority-Munich Patent Office-Jun. 10, 2008.

* cited by examiner

*Primary Examiner*—Jacob Petranek
(74) *Attorney, Agent, or Firm*—Peter M. Kamarchik; Nicholas J. Pauley; Jonathan T. Velasco (57) ABSTRACT

DSP architectures having improved performance are described. In an exemplary architecture, a DSP includes two MAC units and two ALUs, where one of the ALUs replaces an adder for one of the two MAC units. This DSP may be configured to operate in a dual-MAC/single-ALU configuration, a single-MAC/dual-ALU configuration, or a dual-MAC/dual-ALU configuration. This flexibility allows the DSP to handle various types of signal processing operations and improves utilization of the available hardware. The DSP architectures further includes pipeline registers that break up critical paths and allow operations at a higher clock speed for greater throughput.

42 Claims, 9 Drawing Sheets

DIGITAL SIGNAL PROCESSORS WITH CONFIGURABLE DUAL-MAC AND DUAL-ALU

BACKGROUND

I. Field

The present invention relates generally to electronics, and more specifically to digital signal processors (DSPs) with configurable multiply-accumulate (MAC) units and arithmetic logic units (ALUs).

II. Background

DSPs are specialized microprocessors that are specifically designed to execute mathematical computations very rapidly. DSPs are widely used in a variety of electronic units such as compact disc players, PC disk drives, modem banks, audio devices, cellular phones, and so on. In cellular phones, the demand for DSP computation capability continues to grow, driven by the increasing needs of applications such as 3G ($3^{rd}$ generation) modem processing, position determination, image and video processing, 3-D gaming, and so on. These applications require DSPs that can perform computations quickly and efficiently.

A DSP typically contains a MAC unit and an ALU. The MAC unit is used for multiply-accumulate operations, which are commonly used in filtering and signal processing. The ALU is used for addition, subtraction, logical, shift, and bit-manipulation operations. A DSP may also contain multiple MAC units for higher computational throughput. An exemplary dual-MAC DSP architecture is described in U.S. Pat. No. 6,557,022, entitled "Digital Signal Processor with Coupled Multiply-Accumulate Units," issued Apr. 29, 2003.

The goals of any DSP design are to (1) achieve the highest number of operations per unit time and (2) provide flexibility to perform different types of operations concurrently to allow for better utilization of the available hardware. DSP architectures that can satisfy these goals are highly desirable for meeting the processing demands of modern-day applications.

SUMMARY

DSP architectures having improved performance are described herein. In one embodiment, a DSP includes two MAC units and two ALUs, where one of the ALUs replaces an adder for one of the two MAC units. This DSP may be configured, possibly on an instruction-by-instruction basis, to operate in a dual-MAC/single-ALU configuration, a single-MAC/dual-ALU configuration, or a dual-MAC/dual-ALU configuration. The configuration flexibility allows the DSP to handle various types of signal processing operations and improves utilization of the available hardware. The DSP further includes pipeline registers that break up critical paths and allow the DSP to operate at a higher clock speed for greater throughput. Other embodiments of DSP architectures are also described below.

Various aspects and embodiments of the invention are described in further detail below.

In one aspect, a processor is presented comprising: a first multiply-accumulate (MAC) unit operable to receive and multiply first and second operands to obtain a first intermediate result, store the first intermediate result in a first register, add the stored first intermediate result with a third operand, and provide a first output; and a second MAC unit operable to receive and multiply fourth and fifth operands to obtain a second intermediate result, store the second intermediate result in a second register, add a sixth operand with either the stored second intermediate result or a sum of the stored first and second intermediate results, and provide a second output.

In another aspect, a processor is presented comprising: a first multiply-accumulate (MAC) unit including a first multiplier operable to receive and multiply first and second operands and provide a first intermediate result, and a first arithmetic logic unit (ALU) operable to receive the first intermediate result, a third operand, and at least one additional operand, operate on the received operands, and provide a first output; and a second MAC unit including a second multiplier operable to receive and multiply fourth and fifth operands and provide a second intermediate result, a first adder operable to add the second intermediate result with either zero or the first intermediate result from the first MAC unit, and a second adder operable to add an output of the first adder with a sixth operand and provide a second output.

In another aspect, a processor is presented comprising: a first multiply-accumulate (MAC) unit including a first multiplier operable to receive and multiply first and second operands and provide a first intermediate result, a first register operable to store the first intermediate result and provide a stored first intermediate result, and a first arithmetic logic unit (ALU) operable to receive and operate on the stored first intermediate result, a third operand, at least one other operand, or a combination thereof, and provide a first output; and a second MAC unit including a second multiplier operable to receive and multiply fourth and fifth operands and provide a second intermediate result, a second register operable to store the second intermediate result and provide a stored second intermediate result, a first adder operable to add the stored second intermediate result with either zero or the stored first intermediate result from the first MAC unit, and a second adder operable to add an output of the first adder with a sixth operand and provide a second output.

In another aspect, a wireless apparatus is presented comprising: a first multiply-accumulate (MAC) unit including a first multiplier operable to receive and multiply first and second operands and provide a first intermediate result, and a first arithmetic logic unit (ALU) operable to receive the first intermediate result, a third operand, and at least one additional operand, operate on the received operands, and provide a first output; a second MAC unit including a second multiplier operable to receive and multiply fourth and fifth operands and provide a second intermediate result, a first adder operable to add the second intermediate result with either zero or the first intermediate result from the first MAC unit, and a second adder operable to add an output of the first adder with a sixth operand and provide a second output; an ALU path including a shifter operable to receive and shift a seventh operand or an eighth operand and provide a third intermediate result, and a second ALU operable to operate on the third intermediate result, the seventh operand, the eighth operand, or a combination thereof, and provide a third output; and a register file operable to provide the first through eighth operands for the first and second MAC units and the ALU path and to store the first through third outputs from the first and second MAC units and the ALU path.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
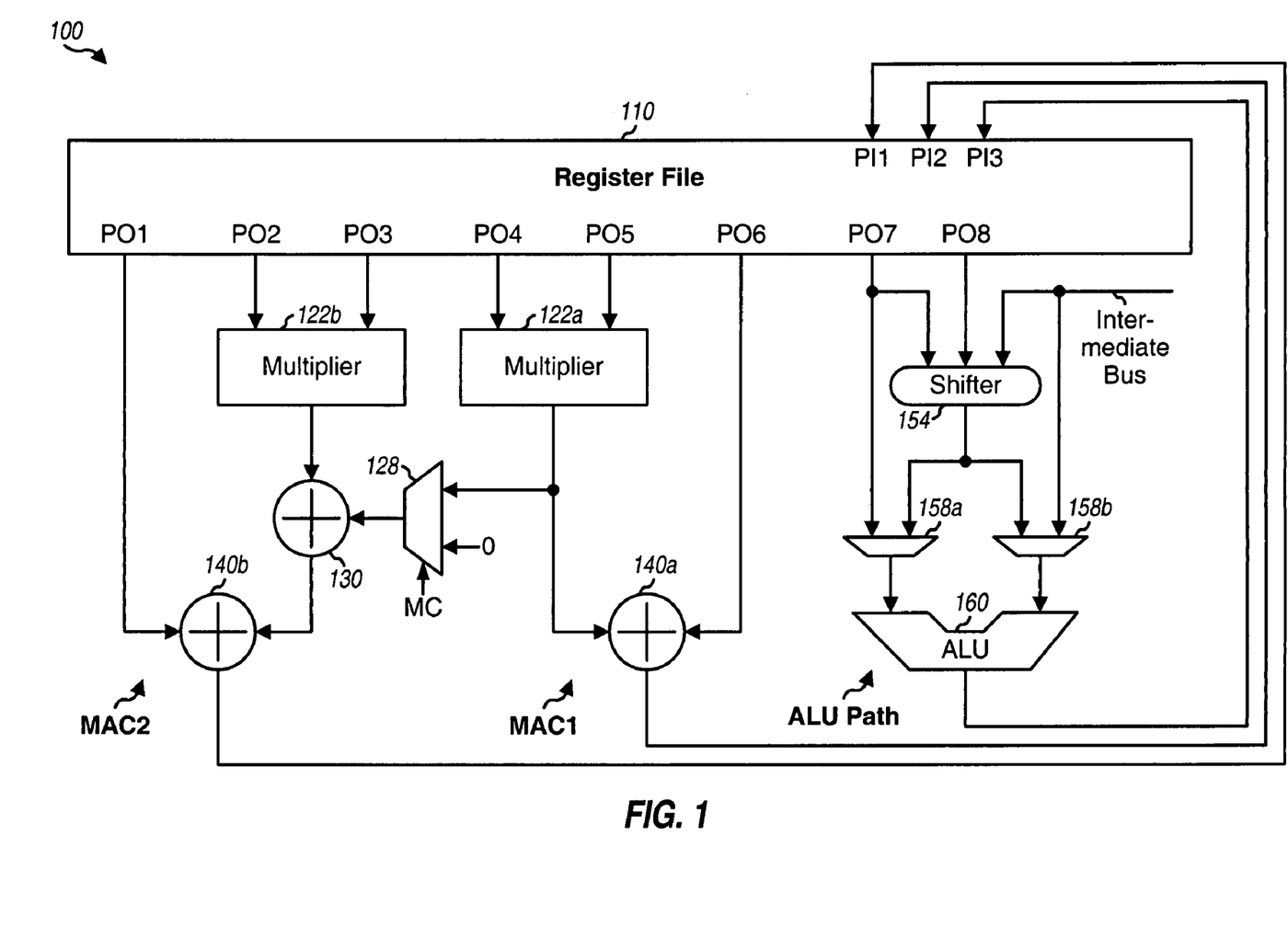
FIG. 1 shows a DSP with two MAC units and one ALU.

FIG. 1 shows a block diagram of a DSP 100 with two MAC units and one ALU. A register file 110 contains a bank of general-purpose registers that can be used to store operands and results for the MAC units and ALU. Register file 110 couples to and exchanges data with a memory unit (not shown in FIG. 1). For the embodiment shown in FIG. 1, register file 110 has three input ports labeled as PI1 through PI3 and eight output ports labeled as PO1 through PO8. In general, a register file can have any number of input and output ports.

For the first MAC unit (MAC1), a multiplier 122a receives and multiplies two operands from output ports PO4 and PO5 of register file 110 and provides a result to one input of an adder 140a. Adder 140a receives another operand from output port PO6, adds two input operands, and provides an output to input port PI2 of register file 110. A multiplexer 128 receives the output of multiplier 122a and a value of zero on two inputs and provides either the multiplier output or zero depending on a multiplexer control (MC).

For the second MAC unit (MAC2), a multiplier 122b receives and multiplies two operands from output ports PO2 and PO3 of register file 110 and provides its result to one input of an adder 130. Adder 130 also receives the output of multiplexer 128, adds two input operands, and provides an output to one input of an adder 140b. Adder 140b receives another operand from output port PO1, adds two input operands, and provides an output to input port PI1 of register file 110.

For the ALU path, a shifter 154 receives two inputs from output ports PO7 and PO8 of register file 110 and a third input from an intermediate bus. The intermediate bus transfers immediate values embedded in an instruction to the ALU. Shifter 154 selects one of the three inputs, shifts the operand from the selected input by a specified number of bits (e.g., 0, 1, 2, or 3 bits to the left), and provides an output to one input of multiplexers 158a and 158b. Multiplexer 158a also receives an operand from output port PO7 and provides one of two inputs to one input of an ALU 160. Multiplexer 158b also receives the immediate values from the intermediate, bus and provides one of two inputs to the other input of ALU 160. ALU 160 operates on its input operands and provides an output to input port PI3 of register file 110.

The units within DSP 110 may be designed with any number of bits. As an example, multipliers 122a and 122b may be 16×16 bit multipliers, adder 130 may be an 32-bit adder, adders 140a and 140b may be 40-bit adders, and shifter 154 and ALU 160 may be 40-bit units. Similarly, register file 110 may be designed with any number of bits for its input and output ports. As an example, output ports PO1, PO6, and PO7 may provide 40-bit operands, output ports PO2, PO3, PO4, and PO5 may provide 16-bit operands, output port PO8 may provide 16-bit or 40-bit operands, and input ports PI1, PI2, and PI3 may receive 40-bit results. The above are exemplary values, and other bit widths may also be used.

DSP 100 may be configured to operate as either two independent MAC units or two coupled MAC units. For the independent dual-MAC configuration, multiplexer 128 is controlled to pass the zero value to adder 130, and MAC1 and MAC2 operate independently and can perform two MAC operations simultaneously on different sets of operands. For the coupled dual-MAC configuration, multiplexer 128 is controlled to pass the output of multiplier 122a, and MAC1 and MAC2 collectively perform the computation: (B*C)±(D*E) or A±(B*C)±(D*E), where A through E are operands from output ports PO1 through PO5, respectively. These two computations are very useful for complex multiply and accumulate operations.

It is highly desirable to increase the speed of the clock for the DSP in order to improve processing capability per unit time (i.e., to perform more operations per second). For example, if the clock speed can be increased by 50%, then 50% more operations may be performed per second with the same hardware. However, since the coupled dual-MAC path and the ALU path each have multiple operations in series on its critical path, the DSP architecture shown in FIG. 1 does not scale well as the clock speed is increased. The coupled dual-MAC path has a multiply and two addition operations in its critical path through multiplier 122a or 122b and adders 130 and 140b. The ALU path has a shift and an addition operation in its critical path. These operations require some time to complete and will thus limit the clock speed that may be used for the DSP.

Figure 2:
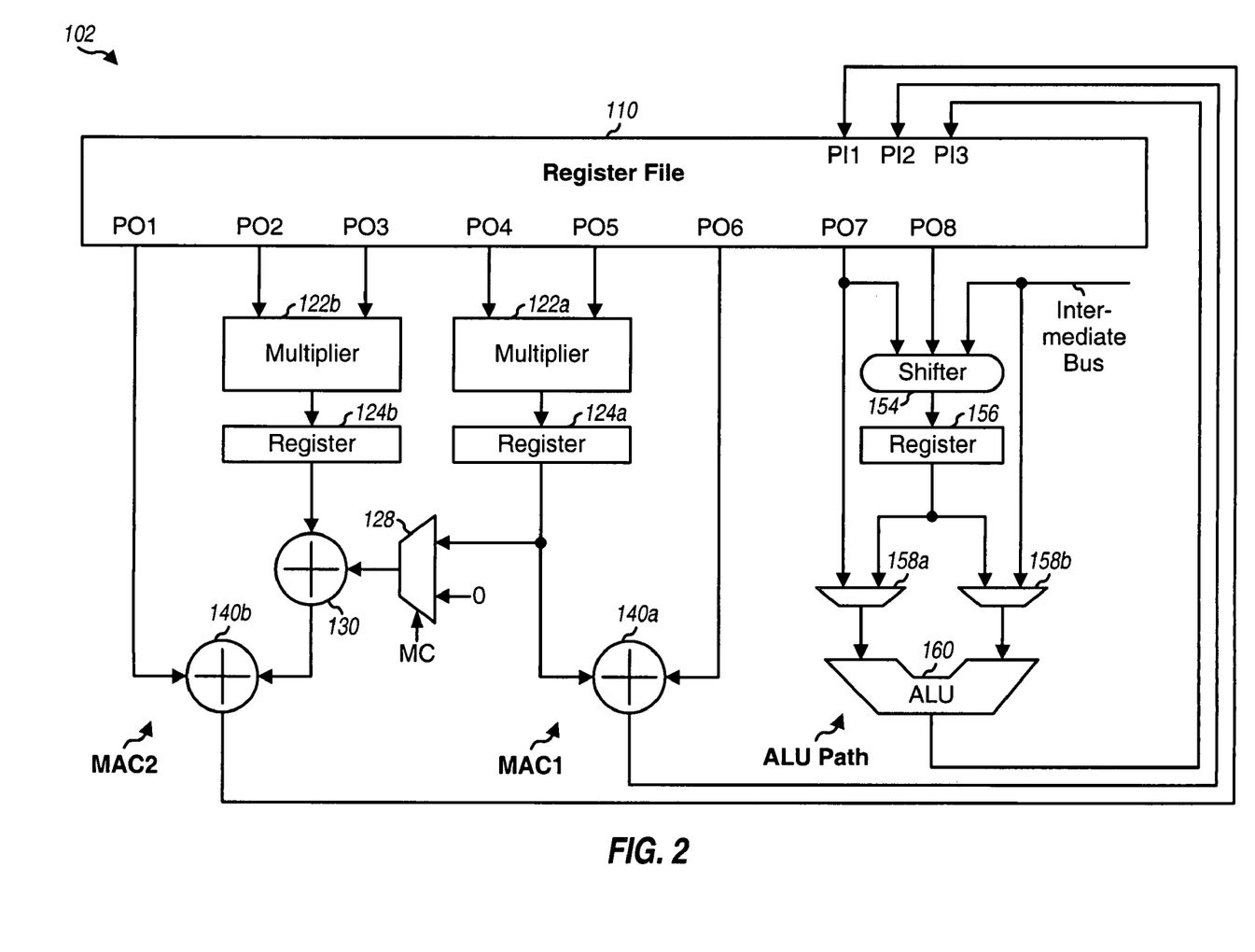
FIG. 2 shows a pipelined DSP with two MAC units and one ALU.

FIG. 2 shows a block diagram of a pipelined DSP 102 with two MAC units and one ALU. DSP 102 includes all of the elements of DSP 100 shown in FIG. 1. DSP 102 further includes (1) a register 124a coupled between multiplier 122a and adder 140a, (2) a register 124b coupled between multiplier 122b and adder 130, and (3) a register 156 coupled between shifter 154 and multiplexers 158a and 158b.

Registers 124a, 124b, and 156 are pipeline registers inserted in the critical paths of MAC1, MAC2, and the ALU path, respectively. These registers break up the critical paths and allow DSP 102 to be clocked at a higher rate. An execution cycle for DSP 102 is broken into two pipeline stages. In the first pipeline stage, multipliers 122a and 122b fetch operands from register file 110, perform multiply operations, and store their results in registers 124a and 124b, respectively. Similarly, for the ALU path, shifter 154 receives inputs from register file 110 and/or the immediate bus, performs shifts as specified, and stores results in register 156. In the second pipeline stage, the adders in MAC1 and MAC2 and ALU 160 in the ALU path are active. For the independent dual-MAC configuration, adder 140a adds the output of register 124a with an operand from output port PO6 and provides an output to input port PI2, and adder 140b adds the output of register 124b with an operand from output port PO1 and provides an output to input port PI1. For the coupled dual-MAC configuration, adder 130 adds the outputs of registers 124a and 124b, and adder 140b adds the output of adder 130 and the operand from output port PO1 and provides an output to input port PI1. For the ALU path, ALU 160 receives the output of register 156 and/or operands from output port PO7 and the intermediate bus, operates on the input operands, and provides an output to input port PI3.

DSP 102 can provide all of the functionalities of DSP 100. However, DSP 102 may be clocked at a faster rate than DSP 100 (up to twice as fast) because the critical paths in DSP 102 are broken up with pipelined registers. This then allows DSP 102 to achieve a higher overall throughput than DSP 100. A pipeline register may also be inserted between adders 130 and 140b to further break up this path, if it is a new critical path with a much longer delay than all other paths in DSP 102. In this case, the execution cycle for DSP 102 would be broken up into three pipeline stages.

The DSP architecture shown in FIG. 1 has limited configurability and does not fit all types of signal processing computations. DSP 100 can perform two (either independent or combined) MAC operations and one ALU operation in parallel. For some applications, it may be preferable to have two ALU operations and a single MAC operation occur in parallel, or to have two MAC operations and two ALU operations all occur in parallel. Applications that favor two ALU operations in parallel include sum of absolute difference (SAD) metric computations for motion estimation in video compression, template comparison in voice recognition, and path distance calculations in Viterbi decoding, all of which are known in the art.

Figure 3:
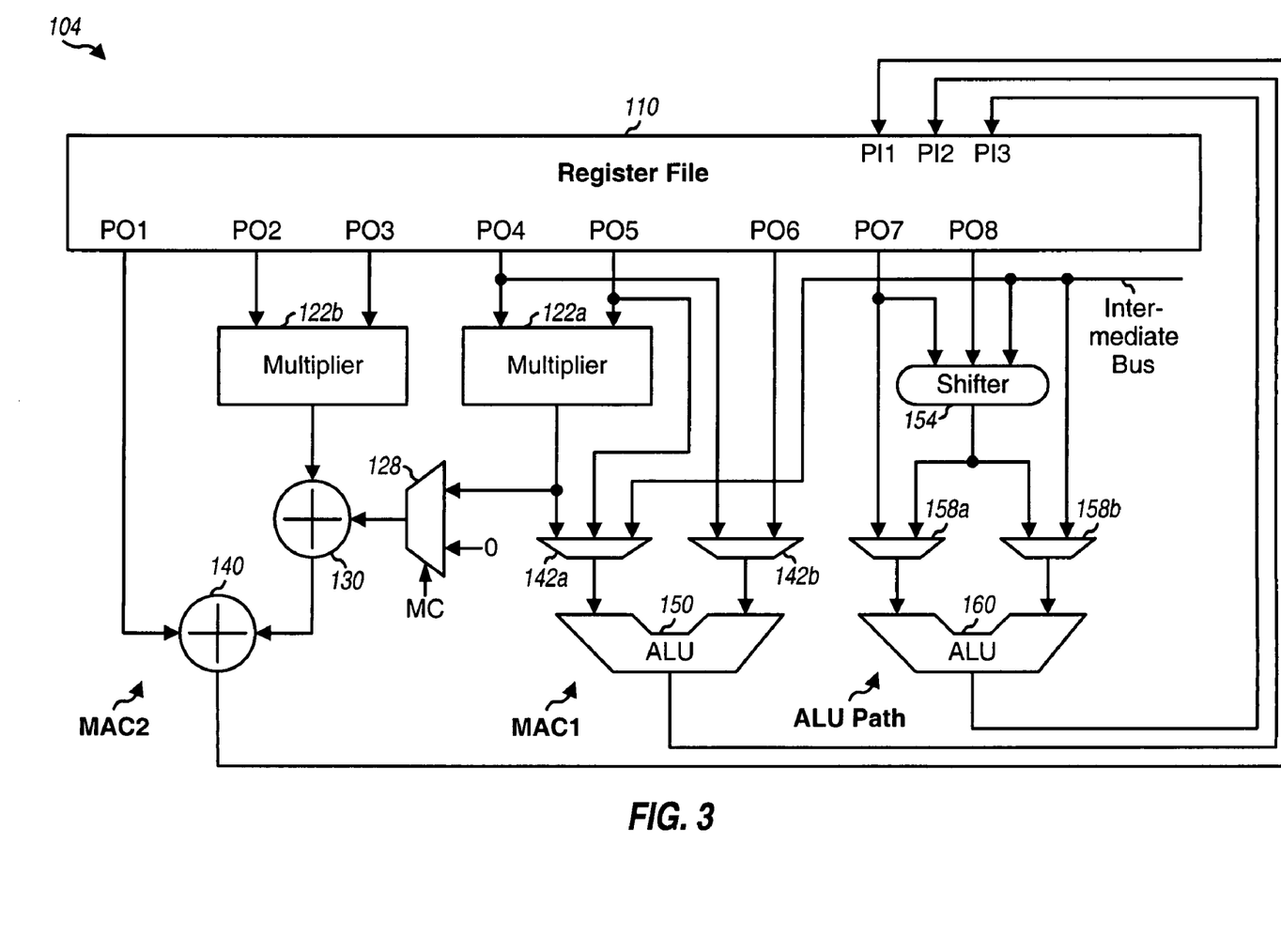
FIG. 3 shows a configurable DSP with two MAC units and two ALUs.

FIG. 3 shows a block diagram of a configurable DSP 104 with two MAC units and two ALUs. DSP 104 includes most of the elements of DSP 100 shown in FIG. 1. DSP 104 further includes multiplexers 142*a* and 142*b* and an ALU 150 that replaces adder 140*a* in DSP 100.

For the embodiment shown in FIG. 3, multiplexer 142*a* receives the output of multiplier 122*a* and operands from output port PO5 and the intermediate bus. Multiplexer 142*a* selects one of its three inputs and provides the operand from the selected input to one input of ALU 150. Multiplexer 142*b* receives operands from output ports PO4 and PO6, selects one of two inputs, and provides the operand from the selected input to another input of ALU 150. ALU 150 can perform logical and bit-manipulation operations along with addition and subtraction operations on its input operands and provides an output to input port PI2.

FIG. 3 shows the use of configurable output ports PO4, PO5, and PO6 of register file 110 to support MAC1 and ALU 150. This reduces the number of output ports needed to support the MAC and ALU, which can simplify the design of the register file. FIG. 3 also shows a specific example for connecting ALU 150 to the output ports of register file 110 and to other units in DSP 104. Other connections are also possible. For example, multiplexers 142*a* and 142*b* may have more inputs to receive more operands and/or may receive operands from different output ports of register file 110.

DSP 104 may be operated in various configurations, which are listed in Table 1. These various configurations may be selected by appropriately setting the connections for the various units within DSP 104, for example, using DSP instructions. The configuration for DSP 104 may be changed dynamically, for example, on an instruction by instruction basis.

TABLE 1

|  | Single MAC | Dual MAC |
| --- | --- | --- |
| Single ALU | Supported | Supported |
| Dual ALU | Supported | Supported |

For DSP 104, some of the operands are shared in some of the configurations because of the limited number of output ports and connections.

The flexibility to operate the DSP in various configurations allows the DSP to better adapt and fit various types of signal processing operations. This then allows for better utilization of the available hardware and higher overall throughput. The various configurations for the DSP are illustrated below.

Figure 4:
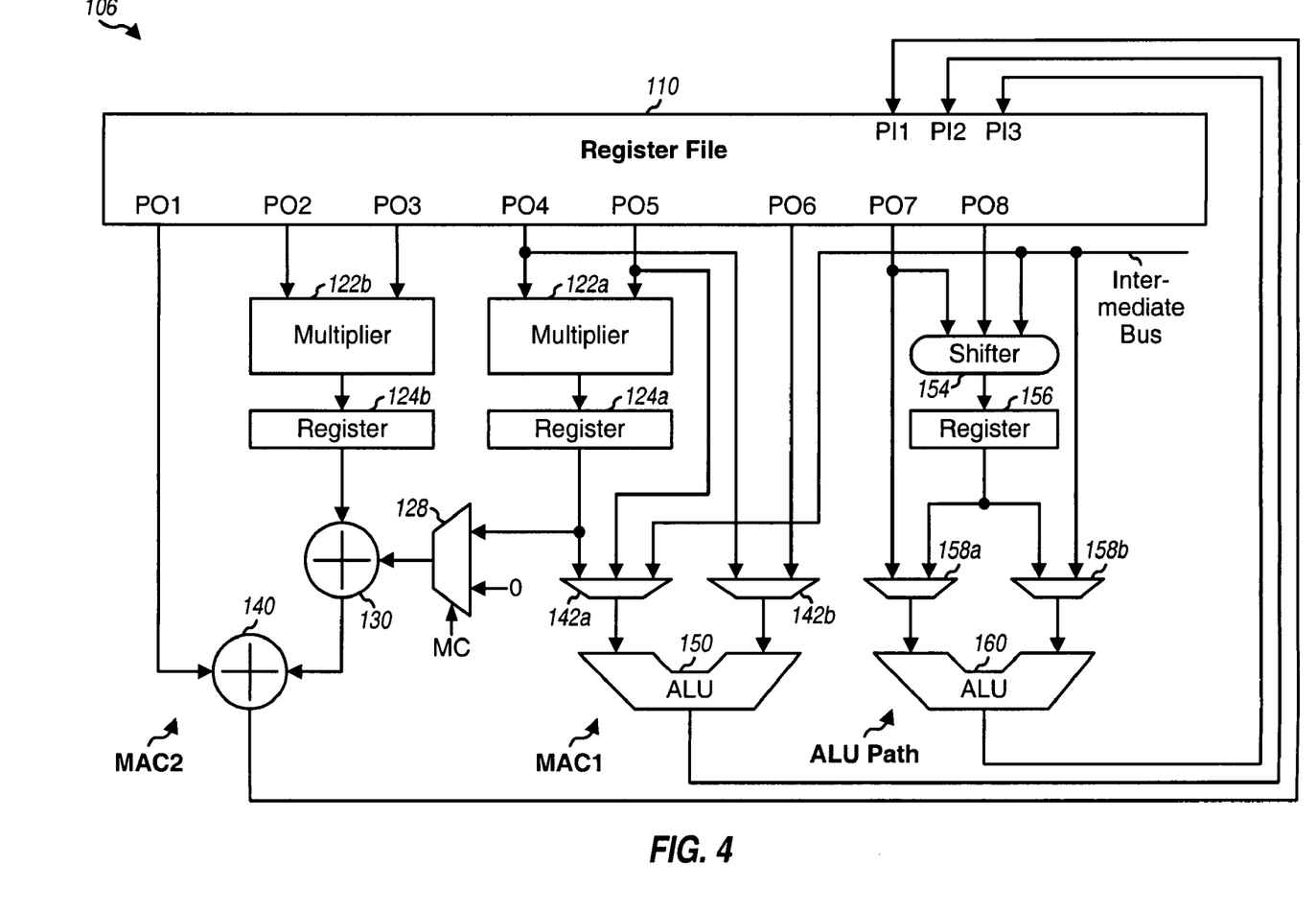
FIG. 4 shows a configurable pipelined DSP with two MAC units and two ALUs.

FIG. 4 shows a block diagram of a configurable pipelined DSP 106 with two MAC units and two ALUs. DSP 106 includes all of the elements of DSP 104 shown in FIG. 3. DSP 106 further includes pipeline registers 124*a*, 124*b*, and 156 that are placed at the output of multipliers 122*a* and 122*b* and shifter 154, respectively. DSP 106 can support all of the configurations shown in Table 1 for DSP 104. However, DSP 106 can be operated at a higher clock speed than DSP 104 because pipeline registers 124*a*, 124*b*, and 156 break up the critical paths for MAC1, MAC2, and the ALU path, respectively.

The DSP datapath may be designed with more units and/or connections than that shown in FIGS. 3 and 4 to achieve even greater flexibility and functionality. Moreover, the register file may be designed with additional output ports to support greater flexibility in selecting operands.

Figure 5:
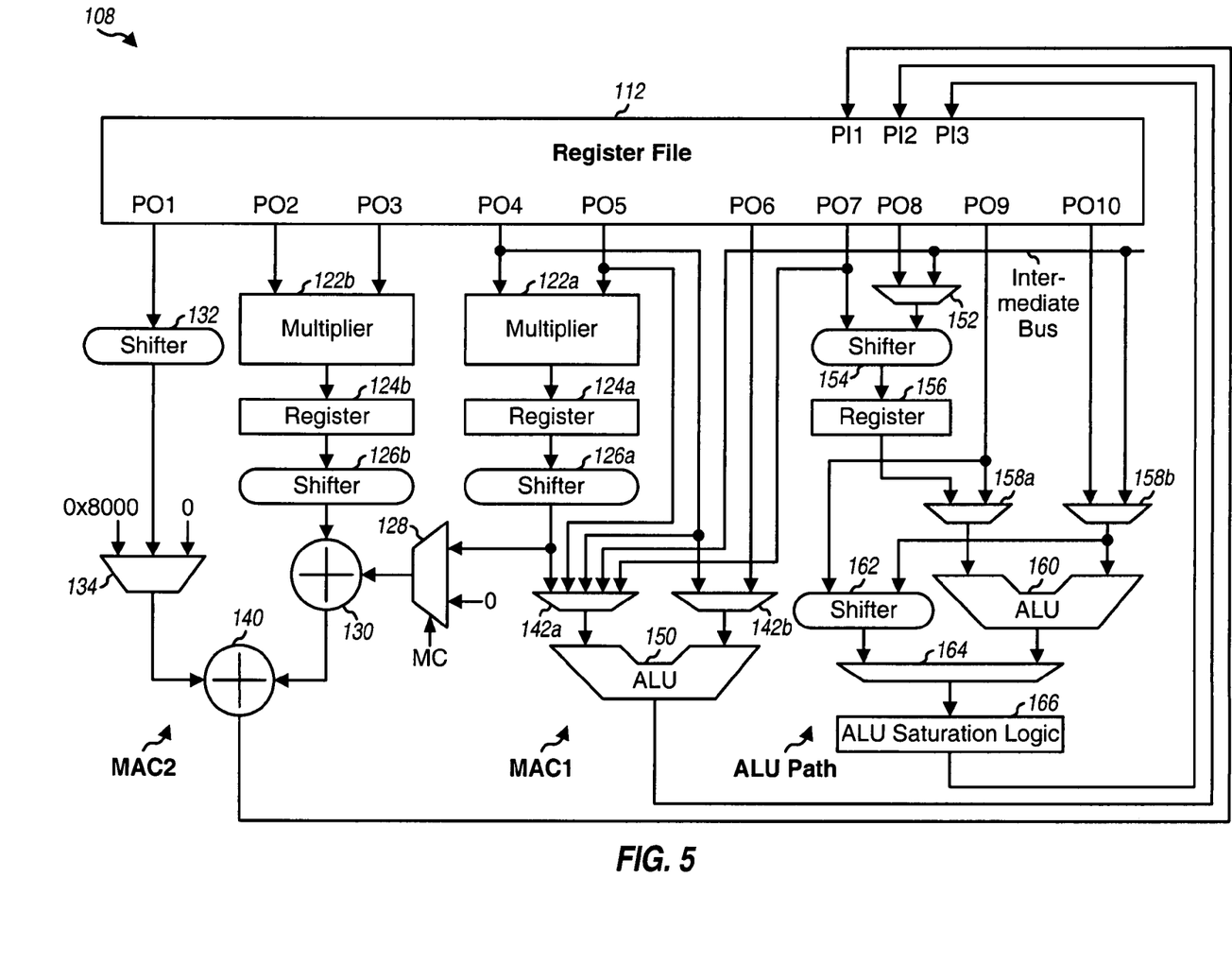
FIG. 5 shows another configurable pipelined DSP with two MAC units and two ALUs.

FIG. 5 shows a block diagram of another configurable pipelined DSP 108 with two MAC units and two ALUs. DSP 108 includes most of the elements of DSP 106 shown in FIG. 4. However, DSP 108 includes a register file 112 having ten output ports that replaces register file 110 having eight output ports. DSP 108 further includes additional units and connections for MAC1 and MAC2 and the ALU path, as described below.

For MAC1, a shifter 126*a* receives the output of register 124*a*, shifts its input operand by a specified number of bits, and provides an output to one input of multiplexers 128 and 142*a*. Multiplexer 142*a* also receives operands from output ports PO4, PO5, and PO7 and the intermediate bus. Multiplexer 142*a* provides one of its five inputs to one input of ALU 150.

For MAC2, a shifter 126*b* receives the output of register 124*b*, shifts its input operand by a specified number of bits, and provides an output to adder 130. A shifter 132 receives the operand from output port PO1, shifts its input operand by a specified number of bits, and provides an output to one input of a multiplexer 134. Multiplexer 134 also receives values of '0' and '0x8000' and provides one of its three inputs to adder 140. In particular, multiplexer 134 provides the '0' value when no addition is required for adder 140, the '0x8000' value for rounding, and the operand from output port PO1 when accumulation is performed.

For the ALU path, a multiplexer 152 receives operands from output port PO8 and the intermediate bus and provides an output to shifter 154. Shifter 154 also receives an operand from output port PO7, selects one of two inputs, shifts the operand from the selected input by a specified number of bits, and provides an output to register 156. Multiplexer 158*a* receives the output of register 156 and an operand from output port PO9, selects one of two inputs, and provides the operand from the selected input to one input of ALU 160. Multiplexer 158*b* receives operands from output port PO10 and the intermediate bus, selects one of two inputs, and provides the operand from the selected input to the other input of ALU 160. ALU 160 operates on its input operands and provides an output to a multiplexer 164. A shifter 162 receives operands from output port PO9 and multiplexer 158*b* at two inputs, selects one of the two inputs, shifts the operand from the selected input by a specified number of bits, and provides an output to multiplexer 164. Multiplexer 164 provides one of two inputs to an ALU saturation unit 166, which saturates the received value and provides the saturated value to input port PI3.

Shifters 126*a*, 126*b*, and 132 are provided in MAC1 and MAC2 to handle numbers of different orders of magnitude. Shifters 154 and 162 are provided in the ALU path for shift operations. Each of these shifters may be individually configured to shift its input operand, for example, by 0, 1, 2, or 3 bits to the left, or by some other range of bit shifts. Multiplexer 134 supplies additional accuracy by providing '0x8000' for rounding, which supplies an additional half-bit of precision.

DSP 108 has the following differences from DSP 100 in FIG. 1. First, pipeline registers 124a and 124b are inserted at the outputs of multipliers 122a and 122b in MAC1 and MAC2, respectively, and pipeline register 156 is inserted at the output of shifter 154 in the ALU path. Second, adder 140a in MAC1 has been replaced with ALU 150, which can perform logical and bit-manipulation operations along with addition and subtraction. Third, shifter 162 and two additional output ports PO9 and PO10 in register file 112 have been added for the ALU path. Fourth, various new connections are now feeding into ALU 150 for MAC 1.

DSP 108 can support all of the configurations shown in Table 1 for DSP 104 in FIG. 3. DSP 108 can support various types and combinations of operations because of the additional shifters, multiplexers, output ports, and connections. DSP 108 can also support a higher clock speed because pipeline registers 124a, 124b, and 156 break up the critical paths for MAC1, MAC2, and the ALU path, respectively.

Figure 6:
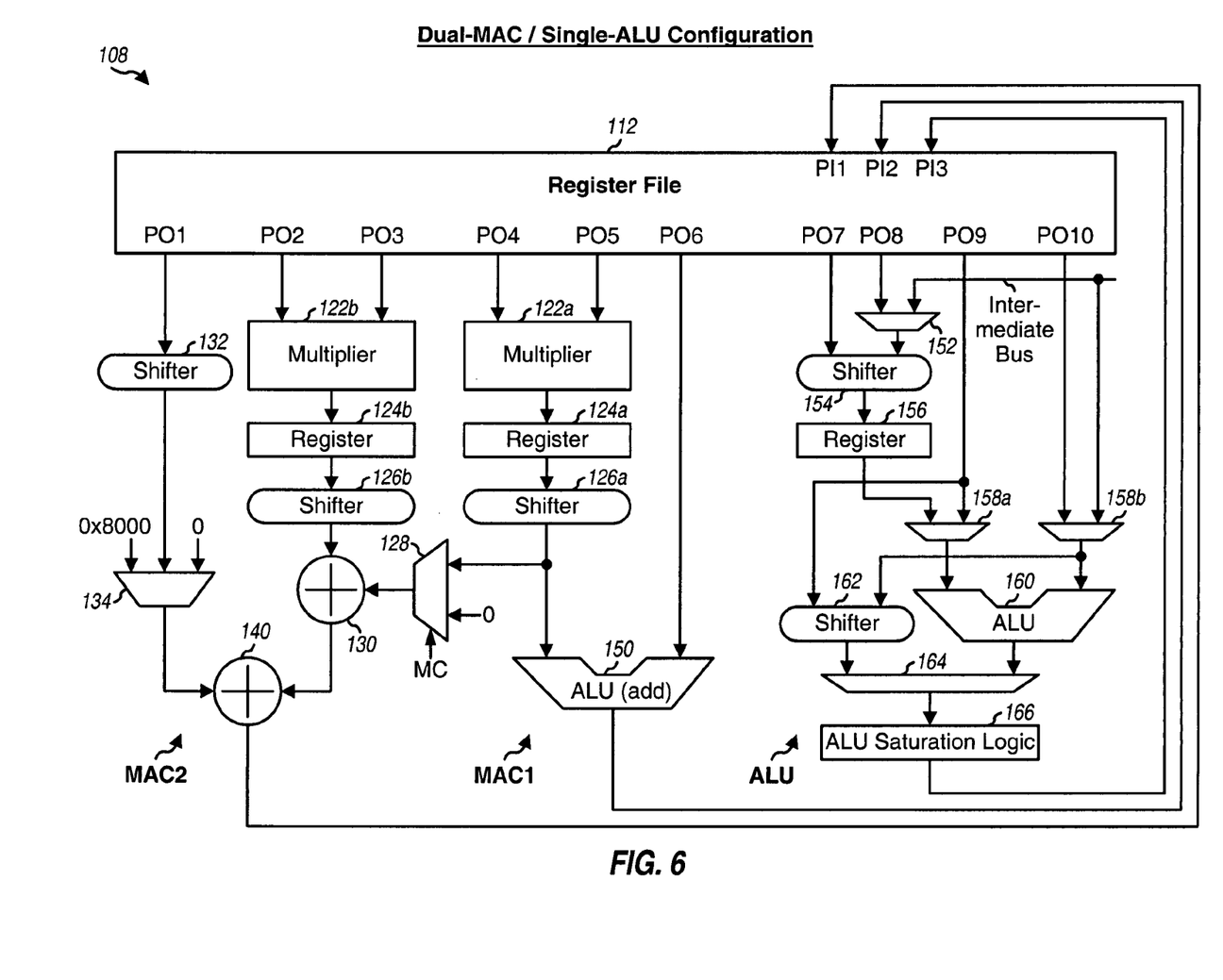
FIGS. 6, 7 and 8 show the DSP of FIG. 5 operating in the dual-MAC/single-ALU, single-MAC/dual-ALU, and dual-MAC/dual-ALU configurations, respectively.

FIG. 6 shows DSP 108 operating in the dual-MAC/single-ALU configuration. In this configuration, MAC1 and MAC2 may be operated independently or in combination by appropriately controlling multiplexer 128. ALU 150 receives the output of shifter 126a (via multiplexer 142a, which is not shown in FIG. 6 for clarity) and an operand from output port PO6 (via multiplexer 142b, which is also not shown). For this configuration, ALU 150 functions as an adder and performs addition on the two input operands.

Figure 7:
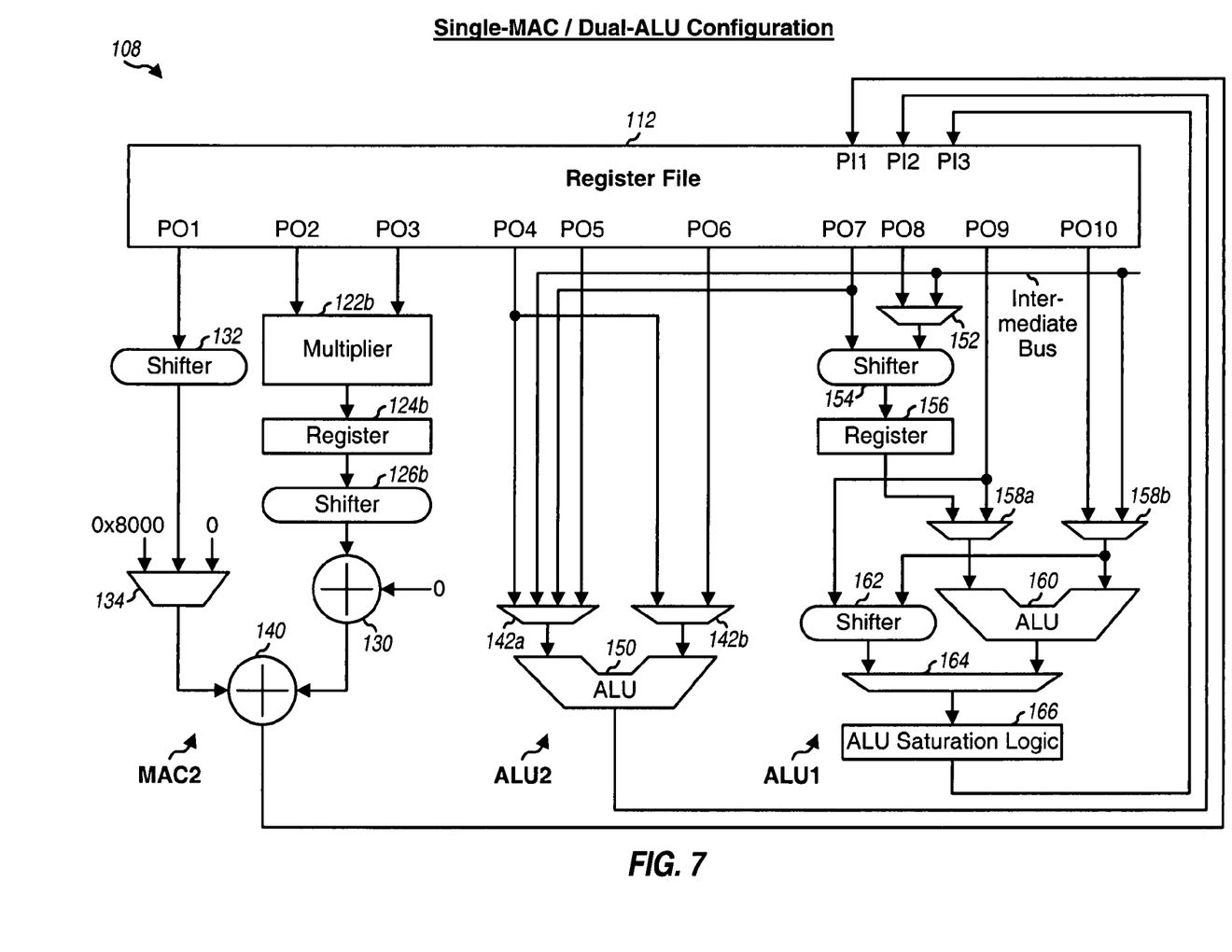

FIG. 7 shows DSP 108 operating in the single-MAC/dual-ALU configuration. In this configuration, MAC1 is bypassed and MAC2 is operational. Multiplexer 142a can receive operands from output ports PO4, PO5, and PO7 and the intermediate bus, select one of the four inputs, and provide the operand from the selected input to one input of ALU 150. Multiplexer 142b can receive operands from output ports PO4 and PO6, select one of the two inputs, and provide the operand from the selected input to the other input of ALU 150. ALU 150 can perform any ALU operation on its input operands.

Figure 8:
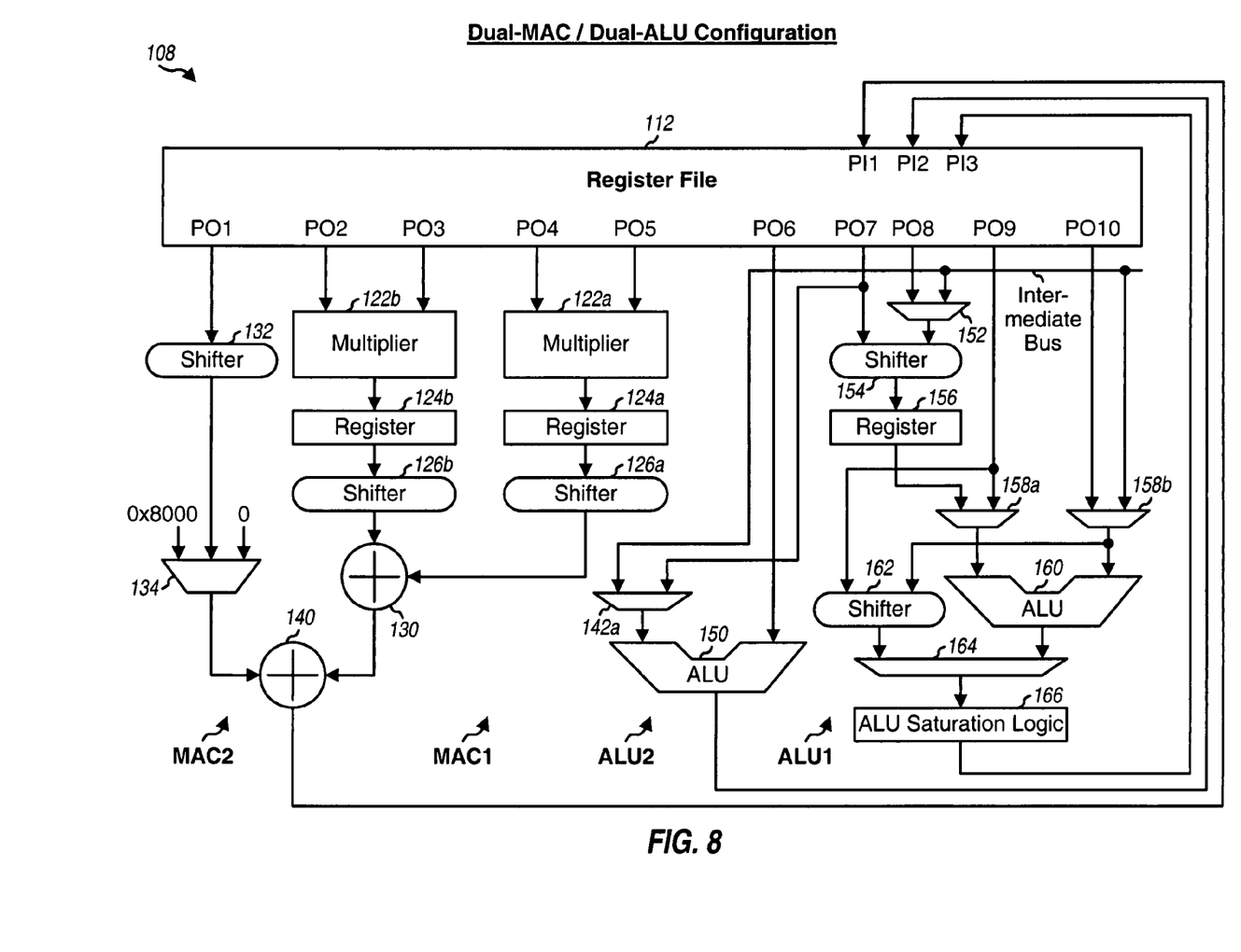

FIG. 8 shows DSP 108 operating in the dual-MAC/dual-ALU configuration. In this configuration, MAC1 and MAC2 are operated in the coupled dual-MAC configuration, and multiplexer 128 is omitted for clarity. Multiplexer 142a can receive operands from output port PO7 and the intermediate bus, select one of the two inputs, provide the operand from the selected input to one input of ALU 150. ALU 150 can also receive an operand from output port PO6 at its other input and perform any ALU operation on its input operands.

DSPs 104 and 106 can also be operated in the dual-MAC/single-ALU, single-MAC/dual-ALU, and dual-MAC/dual-ALU configurations, in a manner similar to that shown in FIGS. 6, 7, and 8 for DSP 108. However, the connections for DSPs 104 and 106 for these various configurations would be different from the connections for DSP 108, since DSPs 104 and 106 have fewer connections, output ports, and multiplexers than DSP 108.

The configurable architectures for DSPs 104, 106, and 108 allow these DSPs to perform various types and combinations of computations in a single instruction. For example, the following computation types and combinations may be performed by these DSPs in one instruction:

A=B+C; D=E+F; G=H+(I*J).
A=B+C; D=E−F; G=H+(I*J)+(K*L).
A=(B<<3)+C; D=E&F; G=H−(I*J).

The input operands for the computations shown above can come from the output ports of the register file and the intermediate bus. The three results A, D, and G for the computations can be provided to the three input ports of the register file. Many other computation types and combinations can also be performed by DSPs 104, 106, and 108.

The configurable architectures for DSPs 104, 106, and 108 are more suitable for all types of signal processing operations than the architecture for DSP 100 because they support all of the parallel combinations shown in Table 1.

The configurable and/or pipeline DSPs described herein may be used for various applications including wireless communication, computing, networking, personal electronics, and so on. An exemplary use of the DSPs for wireless communication is described below.

Figure 9:
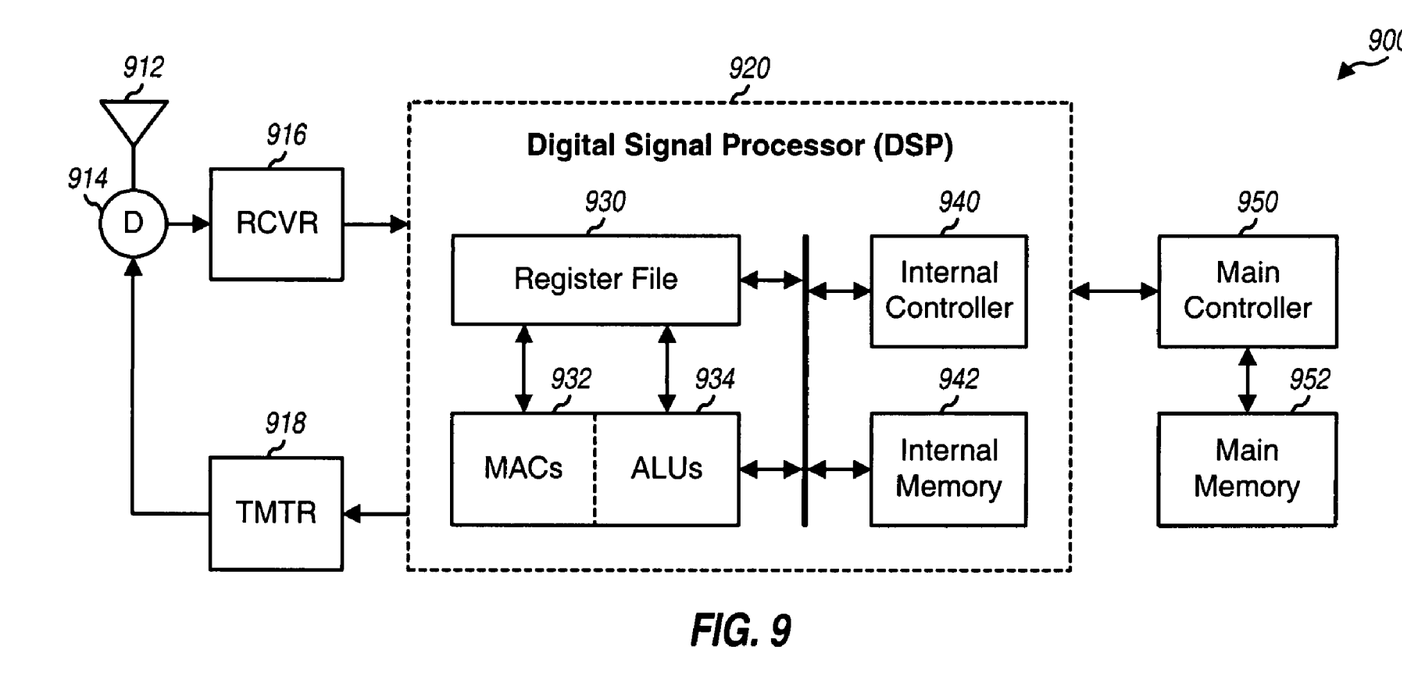
FIG. 9 shows a wireless device in a wireless communication system.

FIG. 9 shows a block diagram of a wireless device 900 in a wireless communication system. Wireless device 900 may be a cellular phone, a handset, a terminal, a mobile station, or some other device or design. The wireless communication system may be a Code Division Multiple Access (CDMA) system, a Global System for Mobile Communications (GSM) system, a multiple-input multiple-output (MIMO) system, an orthogonal frequency division multiplexing (OFDM) system, an orthogonal frequency division multiple access (OFDMA) system, and so on. Wireless device 900 is capable of providing bi-directional communication via a receive path and a transmit path.

For the receive path, signals transmitted by base stations in the system are received by an antenna 912, routed through a duplexer (D) 914, and provided to a receiver unit (RCVR) 916. Receiver unit 916 conditions (e.g., filters, amplifies, and frequency downconverts) the received signal, digitizes the conditioned signal, and provides data samples to a DSP 920 for further processing. For the transmit path, data to be transmitted from wireless device 900 is provided by DSP 920 to a transmitter unit (TMTR) 918. Transmitter unit 918 conditions (e.g., filters, amplifies, and frequency upconverts) the data and generates a modulated signal, which is routed through duplexer 914 and transmitted via antenna 912 to the base stations.

DSP 920 includes various units such as, for example, register file 930, MAC units 932, ALUs 934, an internal controller 940, and an internal memory unit 942, all of which are coupled via an internal bus. Internal controller 940 executes instructions that direct MAC units 932 and ALUs 934 to perform various computations. For example, DSP 920 may perform encoding, interleaving, modulation, code channelization, spectral spreading, filtering, and so on, for the transmit path. DSP 920 may perform filtering, despreading, channelization, demodulating, deinterleaving, decoding, and so on, for the receive path. These various operations are known in the art. The specific processing to be performed by DSP 920 is dependent on the communication system. Register file 930, MAC units 932, and ALUs 934 may be implemented with any of the DSP architectures shown in FIGS. 2, 3, 4 and 5.

Controller 950 controls the operation of DSP 920 and other units within wireless device 900. The other units are not shown in FIG. 9 since they do not contribute to the understanding of the various embodiments. Memory units 942 and 952 store program code and data used by controllers 940 and 950, respectively.

FIG. 9 shows an exemplary design of a wireless device in which the configurable and/or pipeline DSPs described herein may be used. These DSPs may also be used in other electronic devices.

The configurable and/or pipeline DSP architectures described herein may be implemented in various hardware units. For example, these DSP architectures may be implemented in an application specific integrated circuit (ASIC), a digital signal processing device (DSPD), a programmable logic device (PLD), a field programmable gate array (FPGA), a processor, a controller, a micro-controller, a microprocessor, and other electronic units.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A processor having a scalable processor architecture comprising:
    a first multiply-accumulate (MAC) unit coupled to a register file, the first MAC unit comprising:
        a first multiplier operable to receive and multiply first and second operands from the register file and to provide a first product to a first intermediate register,
        a first arithmetic logic unit (ALU) comprising a first input and a second input, the first input operable to selectively receive the first product from the first intermediate register and the first operand via a first multiplexer, the second input operable to selectively receive the second operand and a third operand from the register file via a second multiplexer, the first ALU operable to provide a first output to the register file, wherein the second multiplexer is not coupled to any multiplier output,
    a second MAC unit operable to receive and multiply fourth and fifth operands from the register file to obtain a second product, to store the second product in a second intermediate register, to add a sixth operand with either the stored second product or a sum of the stored first and second product, and to provide a second output to the register file;
    wherein the first MAC unit and the second MAC unit are responsive to a processor instruction to dynamically reconfigure between a first configuration in which the first MAC unit and the second MAC unit operate as dual independent MAC units, and a second configuration in which the first MAC unit and the second MAC unit operate as coupled MAC units; and
    a second ALU to provide a third output to the register file independent of the first and second MAC units;
    wherein operations of the first and second MAC units occur in parallel with an operation of the second ALU.

2. The processor of claim 1, further comprising:
    an arithmetic logic unit (ALU) path operable to receive and perform a first operation on a seventh operand or an eighth operand from the register file to obtain an intermediate result, to store the intermediate result in a third intermediate register, and
    the second ALU operable to perform a second operation on the intermediate result from the third intermediate register, the seventh operand, the eighth operand, or a combination thereof, and to provide the third output.

3. The processor of claim 2, wherein the register file connects to the first MAC unit along a first path, the second MAC unit along a second path and the second ALU along the ALU path, with each path returning to the register file.

4. The processor of claim 1, wherein the first MAC unit includes a first multiplier operable to receive and multiply the first and second operands and provide the first product, whereupon the first intermediate register is operable to store the first product; and wherein the second MAC unit comprises:
    a second multiplier operable to receive and multiply the fourth and fifth operands and provide the second product, whereupon the second intermediate register is operable to store the second product;
    a second adder operable to add the stored second product from the second intermediate register with either zero or the first product from the first intermediate register; and
    a third adder operable to add an output of the second adder with the sixth operand and provide the second output.

5. The processor of claim 2, wherein the ALU path comprises:
    a shifter operable to receive and shift the seventh or eighth operand and provide the intermediate result, whereupon the third intermediate register is operable to store the intermediate result.

6. The processor of claim 1, wherein the first and second MAC units are responsive to the processor instruction on an instruction-by-instruction basis to operate as two separate MAC units or to operate as two coupled MAC units.

7. The processor of claim 1, wherein the processor is controllable to perform the operations (B*C)±(D*E) or A±(B*C)±(D*E), where A through E are operands from output ports PO1 through PO5, respectively, of the register file.

8. A processor having a register file, the processor comprising:
    a first multiply-accumulate (MAC) processing path coupled to the register file, the first MAC processing path comprising:
        a first multiplier operable to receive and multiply first and second operands from the register file and to provide a first product;
        a first multiplexer operable to receive the first product and to receive the first operand from the register file;
        a second multiplexer operable to receive the second operand and a third operand from the register file, wherein the second multiplexer is not coupled to any multiplier output; and
        a first arithmetic logic unit (ALU) comprising a first input and a second input, the first input operable to selectively receive the first product and the first operand via the first multiplexer, the second input operable to selectively receive the second operand and the third operand via the second multiplexer, the first ALU operable to provide a first output;
    a second MAC processing path coupled to the register file, the second MAC processing path comprising:
        a second multiplier operable to receive and multiply fourth and fifth operands from the register file and to provide a second product;
        a first adder operable to add the second product with either zero or the first product from the first processing path; and
        a second adder operable to add an output of the first adder with a sixth operand from the register file and to provide a second output; and
    an ALU processing path coupled to the register file, the ALU processing path comprising a second ALU to provide a third output to the register file independent of the first and second MAC processing paths; and wherein operations of the first and second MAC processing paths and the ALU processing path occur in parallel.

9. The processor of claim 8, the ALU processing path further comprising:
a shifter operable to receive and shift a seventh operand or an eighth operand from the register file and to provide an intermediate result; and
the second ALU operable to operate on the intermediate result, the seventh operand, the eighth operand, or a combination thereof, and to provide the third output;
wherein the ALU processing path is operable in parallel with the first and second processing paths.

10. The processor of claim 9, wherein the register file includes at least two output ports configurable to support the first MAC processing path operating as either a MAC or an ALU.

11. The processor of claim 9, wherein the first and second ALUs are further operable to receive operands from an intermediate bus.

12. The processor of claim 9, wherein the processor is configurable to operate in a dual-MAC/single-ALU configuration, a single-MAC/dual-ALU configuration, or a dual-MAC/dual-ALU configuration.

13. The processor of claim 9, wherein the processor is configurable, on an instruction-by-instruction basis, to operate in a dual-MAC/single-ALU configuration, a single-MAC/dual-ALU configuration, or a dual-MAC/dual-ALU configuration.

14. The processor of claim 8, further comprising:
a first intermediate register operable to store the first product and to provide a stored first product to the first ALU and the first adder; and
a second intermediate register operable to store the second product and to provide a stored second product to the first adder.

15. The processor of claim 9, further comprising:
a first intermediate register operable to store the first product and to provide a stored first product to the first ALU and the first adder;
a second intermediate register operable to store the second product and to provide a stored second product to the first adder; and
a third intermediate register operable to store the intermediate result and to provide a stored intermediate result to the second ALU.

16. The processor of claim 8, wherein the processor is controllable to perform the operations (B*C)±(D*E) or A±(B*C)±(D*E), where A through E are operands from output ports PO1 through PO5, respectively, of the register file.

17. The processor of claim 9, wherein the processor is dynamically configurable on an instruction-by-instruction basis to function as a dual MAC unit in parallel with a dual ALU unit.

18. The processor of claim 9, wherein the processor is dynamically configurable to perform various types of computations, the computations comprising: A=B+C, D=E+F, and G=H+(I*J), where A through H are operands received from output ports of the register file or an intermediate bus.

19. The processor of claim 18, where results A, D, and G are returned as results to input ports of the register file.

20. The processor of claim 9, wherein the processor is dynamically configurable to perform various types of computations, the computations comprising: A=B+C, D=E−F, and G=H+(I*J)+(K*L), where A through L are operands received from output ports of the register file or an intermediate bus.

21. The processor of claim 20, where results A, D, and G are returned as results to input ports of the register file.

22. The processor of claim 9, wherein the processor is dynamically configurable to perform various types of computations, the computations comprising: A=(B<<3)+C, D=E&F, and G=H−(I*J), where A through J are operands received from output ports of the register file or an intermediate bus.

23. The processor of claim 22, where results A, D, and G are returned as results to input ports of the register file.

24. The processor of claim 8, wherein the first MAC processing path is selectably configurable to provide operands to the first multiplier and to the first ALU in parallel.

25. The processor of claim 8, wherein the first MAC processing path is selectably configurable to provide operands to the first multiplier without providing operands to the first ALU, or to the first ALU without providing operands to the first multiplier.

26. The processor of claim 8, wherein the first option or the second option is selected based on a digital signal processor (DSP) instruction.

27. The processor of claim 8, wherein a third multiplexer is operable to selectively provide the first product and the zero to the first adder.

28. A method, comprising:
receiving a first processor instruction at a processor operating in a first configuration; and
reconfiguring the processor to operate in a second configuration in response to the first processor instruction, wherein reconfiguring the processor comprises:
receiving first and second operands from a register file at a multiplier to provide a first product;
receiving the first product from the multiplier and the first operand from the register file at a first multiplexer;
receiving the second operand and a third operand from the register file at a second multiplexer, wherein the second multiplexer is not coupled to any multiplier output;
selectively providing the first product or the first operand via the first multiplexer to a first input of an arithmetic logic unit (ALU) based on a selected configuration; and
selectively providing the second operand or the third operand via the second multiplexer to a second input of the ALU based on the selected configuration.

29. The method of claim 28, further comprising:
performing a first set of parallel computations in response to the first processor instruction, the first set of parallel computations including A=B+C, D=E−F, and G=H+(I*J)+(K*L).

30. The method of claim 28, further comprising:
receiving a second processor instruction at the processor; and
reconfiguring the processor to operate in a third configuration in response to the second processor instruction, the third configuration differing from each of the first configuration and the second configuration.

31. The method of claim 30, wherein each of the first configuration, the second configuration, and the third configuration is a different one of a dual-independent-MAC/single-ALU configuration, a single-MAC/dual-ALU configuration, and a dual-coupled-MAC/dual-ALU configuration.

32. The method of claim 31, further comprising:
performing a first set of parallel computations in response to the first processor instruction, the first set of parallel computations including A=B+C, D=E−F, and G=H+(I*J)+(K*L);
performing a second set of parallel computations in response to the second processor instruction, the second set of parallel computations including A=(B<<3)+C, D=E&F, and G=H−(I*J); and
performing a third set of parallel computations in response to a third processor instruction received at the processor, the third set of parallel computations including A=B+C, D=E+F, and G=H+(I*J).

33. A digital signal processor (DSP), comprising:
a plurality of multipliers and at least one arithmetic logic unit (ALU); and
a first multiplexer configured to selectively remove a multiplier of the plurality of multipliers from a first multiply-accumulate (MAC) processing path to form an ALU processing path independent of the first MAC processing path, wherein the at least one ALU is configurable to perform logical functions, bit-manipulation functions, addition, and subtraction, wherein the first multiplexer is configured to receive a product from the multiplier, wherein the first multiplexer is configured to provide a first operand input to the at least one ALU; and
a second multiplexer configured to provide a second operand input to the at least one ALU, wherein the second multiplexer is not coupled to an output of any multiplier of the plurality of multipliers.

34. The processor of claim 33, wherein an operation of the first multiplexer is responsive to DSP instructions on an instruction-by-instruction basis to dynamically reconfigure the DSP.

35. The processor of claim 34, further comprising:
a third multiplexer configured to selectively add the product from the multiplier to a second MAC processing path, wherein an operation of the third multiplexer is responsive to the DSP instructions on an instruction-by-instruction basis to further dynamically reconfigure the DSP.

36. An apparatus comprising:
a processor comprising:
   a plurality of multipliers and at least one arithmetic logic unit (ALU); and
   a first multiplexer configured to selectively remove a multiplier of the plurality of multipliers from a first multiply-accumulate (MAC) processing path to form an ALU processing path independent of the first MAC processing path, wherein the first multiplexer is configured to receive a product from the multiplier, wherein the first multiplexer is configured to provide a first operand input to the at least one ALU; and
   a second multiplexer configured to provide a second operand input to the at least one ALU, wherein the second multiplexer is not coupled to an output of any multiplier.

37. The apparatus of claim 36, wherein the processor is a digital signal processor (DSP).

38. The apparatus of claim 36, further comprising an antenna coupled to the processor to communicate wireless information in a wireless communication system.

39. The apparatus of claim 36, wherein the processor further comprises a register file operative to provide a first operand to a first input of the second multiplexer and to provide a second operand to a second input of the second multiplexer.

40. A processor comprising:
means for performing multiplication and means for performing an arithmetic logic operation;
a first means for selecting between at least a first operand input from an output of the multiplication means and a second operand input from a register file, the first means for selecting operative to provide a first selected operand to an arithmetic logic unit (ALU), wherein the second operand input from the register file is also provided to a first input of the means for performing multiplication; and
a second means for selecting between a third operand input from the register file and a fourth operand input from the register file, the second means for selecting operative to provide a second selected operand to the ALU, wherein the second means for selecting is not coupled to an output of any multiplication means, and wherein the third operand input from the register file is also provided to a second input of the means for performing multiplication.

41. The processor of claim 40, wherein the first selection means is responsive to processor instructions on an instruction-by-instruction basis to dynamically reconfigure the processor.

42. The processor of claim 41, further comprising a third means for selecting between the first operand input and a zero value to selectively add the first operand input from the means for performing multiplication to a processing path, wherein the third means for selecting is responsive to the processor instructions on an instruction-by-instruction basis to further dynamically reconfigure the processor.

* * * * *

UNITED STATES PATENT AND TRADEMARK OFFICE
CERTIFICATE OF CORRECTION

PATENT NO. : 7,873,815 B2
APPLICATION NO. : 10/794300
DATED : January 18, 2011
INVENTOR(S) : Sih et al.

Page 1 of 1

It is certified that error appears in the above-identified patent and that said Letters Patent is hereby corrected as shown below:

Column 9, line 43, claim 1: "product" to read as --products--

Signed and Sealed this
Thirtieth Day of August, 2011

David J. Kappos
*Director of the United States Patent and Trademark Office*